United States Patent [19]

Dickens

[11] Patent Number: 4,809,372
[45] Date of Patent: Mar. 7, 1989

[54] MOTOR VEHICLE INVALID LIFT

[76] Inventor: James Dickens, 28 Westland St., Hartford, Conn. 06120

[21] Appl. No.: 165,815

[22] Filed: Mar. 9, 1988

[51] Int. Cl.⁴ .......................... B60P 1/54; B60P 1/02
[52] U.S. Cl. .......................................... 5/81 R; 5/83; 224/311; 414/542; 414/921; 212/180
[58] Field of Search ............... 5/81 R, 83, 84, 89; 414/542, 921; 224/311, 320; 212/180

[56] References Cited

U.S. PATENT DOCUMENTS

| | | | |
|---|---|---|---|
| 2,650,725 | 9/1953 | Moyer et al. | 5/83 |
| 3,656,637 | 4/1972 | Lynn et al. | 414/542 |
| 3,983,584 | 10/1976 | Holecek | 414/921 |
| 4,281,958 | 8/1981 | Molski | 414/542 |
| 4,527,827 | 7/1985 | Maniscalco et al. | 224/311 |
| 4,544,321 | 10/1985 | Lanier | 414/542 |

*Primary Examiner*—Alexander Grosz
*Attorney, Agent, or Firm*—Fishman, Dionne & Cantor

[57] ABSTRACT

An invalid car lift is presented which comprises a bar which is mounted on the inside of a car with the help of a strap. A winch device is mounted in bearing relationship on the bar so that the winch may be moved laterally along the bar. The winch may be of the well known type which includes a handle attached to suitable rope or metal line and includes a hook. The hook is engaged to a basket. Thus, when a person in a wheelchair is brought up to the car and positioned under the winch, the person may be lifted off the wheelchair by the winch/basket. Thereafter the winch is rolled along the bar and into the car. Next, the winch is lowered and the person is disconnected therefrom. The bar preferably is hinged so that it may be easily folded and stored in the trunk during transportation.

5 Claims, 2 Drawing Sheets

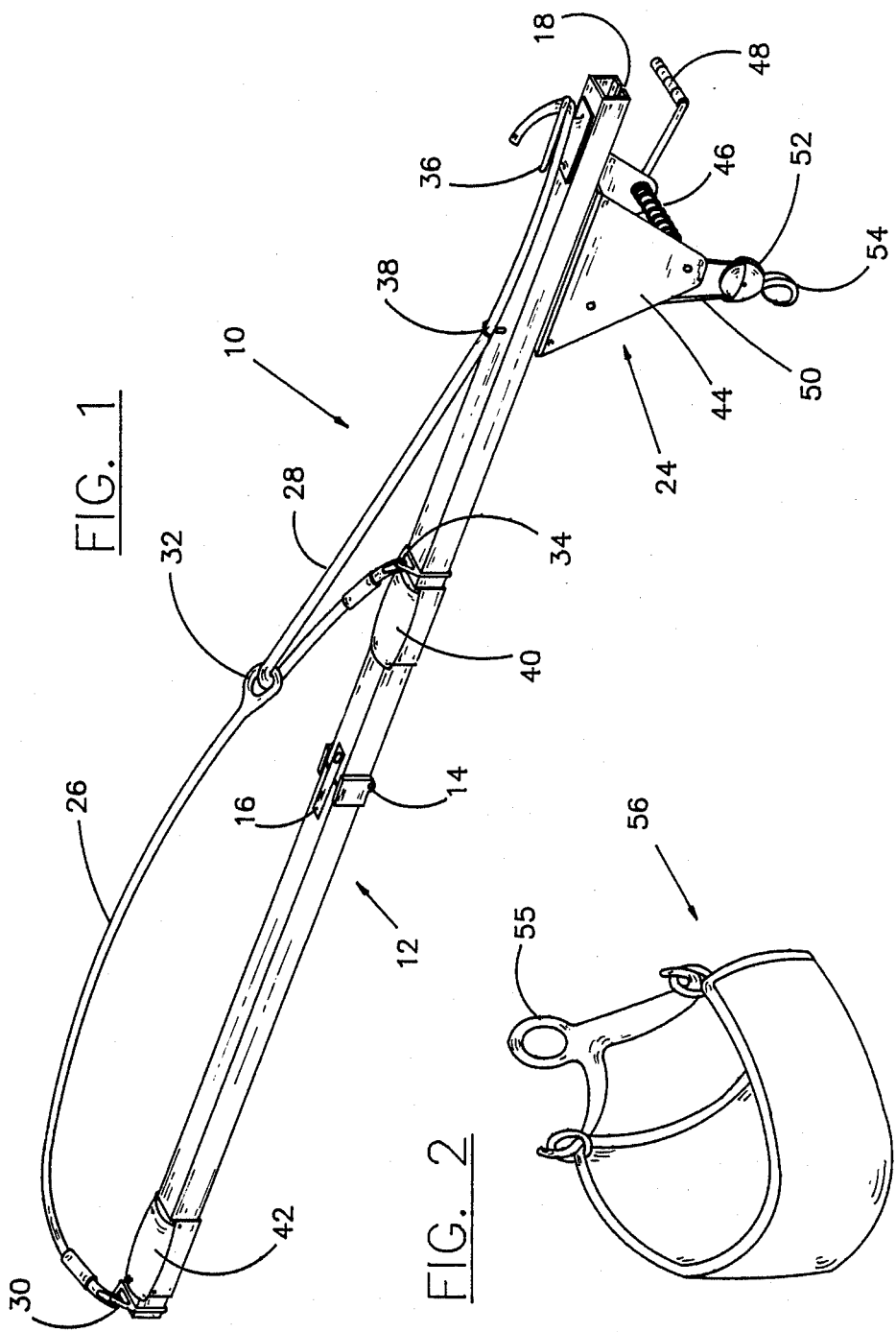

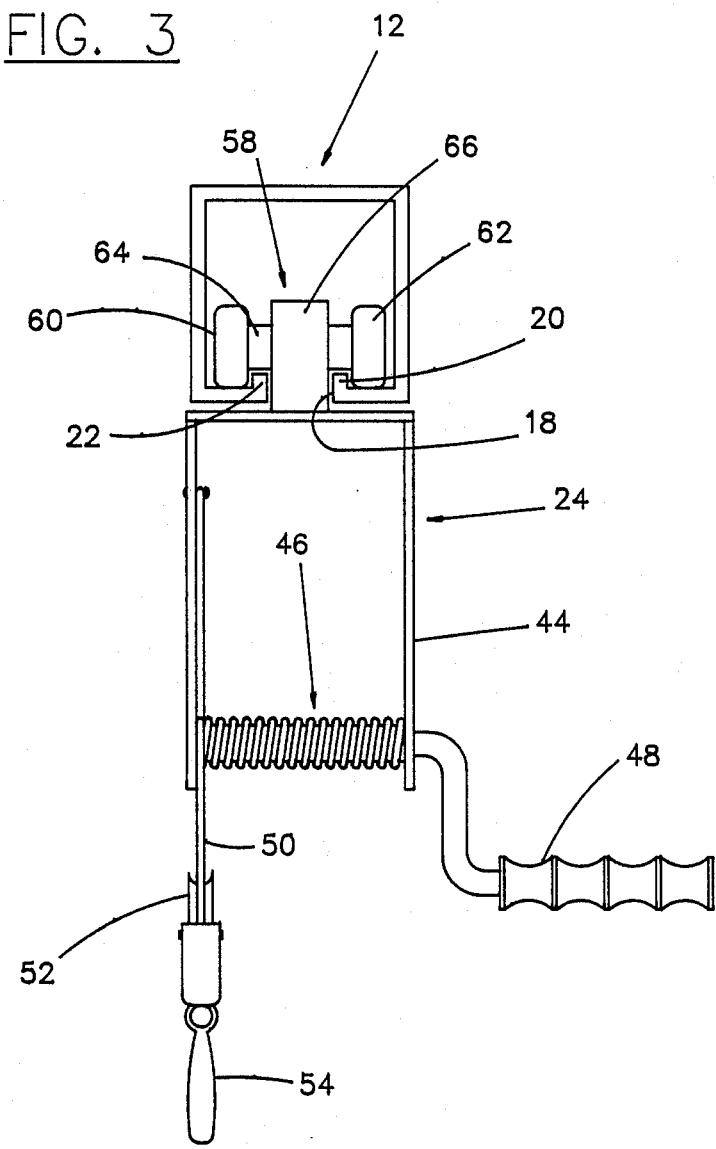

MOTOR VEHICLE INVALID LIFT

BACKGROUND OF THE INVENTION

This invention relates to an apparatus for transferring wheelchair invalids into and out of a motor vehicle seat. More particularly, this invention relates to an invalid car lift which can be easily folded up and carried in the trunk of the automobile, along with the folded up wheelchair.

Polio victims, paraplegics and others who have lost the use of their legs and are therefore confined to wheelchairs have a difficult time getting into and out of automobiles. Accordingly, there has been a recognized need for a portable apparatus that could be carried in the car trunk to enable an invalid to be quickly and easily transferred for his wheelchair into a car seat and vice versa. Prior invalid car lift devices are known and examples are disclosed in U.S. Pat. Nos. 2,650,725, 3,656,637, 3,677,424 and 3,983,584.

The invalid car lift of U.S. Pat. No. 3,656,637 includes an extendible bar having a winch mechanism attached thereto. The extendible bar is configured for mounting onto the side rain gutter of an automobile. It will be appreciated that such mounting entails certain difficulties in view of the fact that many rain gutters cannot support the weight of the lifting device and invalid being carried thereby. In addition, many modern vehicles no longer include rain gutters thereon.

The other above-noted patents also suffer from certain drawbacks and deficiencies. For example, many of these prior art devices have many parts and are cumbersome and bulky. As a result, these prior art devices are expensive to manufacture and difficult to use.

SUMMARY OF THE INVENTION

The above-discussed and other deficiencies of the prior art are overcome or alleviated by the novel invalid car lift of the present invention. In accordance with the present invention, the invalid car lift comprises a bar which is mounted on the inside of a car with the help of a strap. A winch device is mounted in bearing relationship on the bar so that the winch may be moved laterally along the bar. The winch may be of the well known type which includes a handle attached to suitable rope or metal line and including a hook. The hook is engaged to a basket. Thus, when a person in a wheelchair is brought up to the car and positioned under the winch, the person may be lifted off the wheelchair by the winch/basket. Thereafter, the winch is rolled along the bar and into the car. Next, the winch is lowered and the person is disconnected therefrom.

The bar preferably is hinged so that it may be easily folded and stored in the trunk during transportation.

The above-discussed and other features and advantages of the present invention will be appreciated and understood by one of ordinary skill in the art from the following detailed description and drawings.

BRIEF DESCRIPTION OF THE DRAWINGS

Referring now to the drawings, wherein like elements are numbered in the several FIGURES:

FIG. 1 is a perspective view of an invalid car lifting device in accordance with the present invention;

FIG. 2 is a perspective view of a basket used in conjunction with the lifting device of FIG. 1; and FIG. 3 is a perspective view of the lifting device of FIG. 1 shown in operation lifting a person into an automobile.

DESCRIPTION OF THE PREFERRED EMBODIMENT

Referring first to FIG. 1 and 3, a handicapped lifting device for use in conjunction with a motor vehicle, particularly an automobile, is shown generally at 10. Lifting device 10 includes a bar 12 which has been severed in about the middle thereof and is connected together by hinge 14 and locking bolt 16. Thus, it will be appreciated that bar 12 may be unlocked at bolt 16 and pivoted about hinge 14 during storage. Bar 12 is of generally rectangular cross section and includes a longitudinal slot 18 therethrough defined between a pair of opposed upturned side walls 20 and 22. It will be appreciated that upturned side walls 20 and 22 together with the remainder of bar 12 constitutes a track for receiving the winch mechanism shown generally at 24. The upper surface of bar 12 includes an adjustable strap comprised of a first strap section 26 and a second strap section 28. First strap section 26 is permanently attached at pivot point 30 to bar 12 and terminates at its other end at a loop 32. Second strap portion 28 is permanently attached to bar 12 at a pivot point 34 and is brought through loop 32 for ultimate connection to a hold down 36 on bar 12. Preferably, a guide 38 is positioned on bar 12 to guide strap portion 28 to hold down 36. Finally, bar 12 further includes a pair of space pads 40 and 42.

During use, bar 12 is folded at hinge 14 and locked in place as shown in the FIGURES. Thereafter, bar 12 is positioned within the automobile between a pair of opposed front or back open windows. Next, strap portion 26 is brought over the top of the automobile whereupon strap portion 28 is inserted through loop 32. At this point, strap portion 28 is pulled with sufficient force so as to tighten strap 26 over the roof of the automobile thereby forcing pads 42 and 40 tightly up against the interior roof of the automobile. After strap 26 has been sufficiently tightened by pulling on strap 28, strap 28 is then looped around hold down 36 and secured.

Winch mechanism 24 is of the well known type which comprises a housing 44 having a pulley system 46 therein. Pulley 46 is attached to a rotatable handle 48 and includes a sufficient length of strong rope or metal line 50. Line 50 terminates at a pulley 52 and hook 54. Hook 54 is adapted to engage a loop 55 on the basket shown generally at 56 in FIG. 2. It will be appreciated that winch mechanism 24 includes a bearing means 58 which permits winch 24 to easily slide along track 18 of bar 12. In the embodiment shown, bearing means 58 comprises a Pair of wheels 60 and 62, rotatably mounted on an axle 64. Axle 64 is mounted in an arm 66 which is connected to housing 44 of winch 24.

During use, basket 56 is placed on the wheelchair such that the invalid is sitting in the basket when it time for entry into the automobile. Next, hook 54 is engaged with loop 55 of basket 56. Winch mechanism 24 is then actuated so that the turning of handle 48 will pull line 50 and lift the invalid upwardly out of the wheelchair. When the invalid has reached the proper height, that is the height which is somewhat above the car seat, winch mechanism 24 is pushed along track 18 so as to be said laterally along longitudinal bar 12 and into the motor vehicle. When the winch has been repositioned to a location above the seat where the invalid wishes to sit, winch handle 48 is again actuated to thereby lower the invalid onto the seat. Next, hook 54 is detached from loop 55 and if desired, the basket 56 may be removed from underneath the invalid. At this point, strap 28 is untied from hold down 36 so that strap 28 may be un-looped from strap 26 and bar 12 may be removed from the automobile. Next, lock 16 is opened and bar 12 is pivoted about hinge 14 for storage in the trunk or other location.

It will be appreciated that while bar 12 has been described as being held onto the interior of the automobile by way of a two-strap assembly, any other suitable means of holding bar 12 onto the interior of the automobile may also be used including a single strap, suction cups or any other suitable method.

An important feature of the present invention is that bar 12 is positioned within the interior of the automobile and is held tightly against the roof of the car by way of a strap or other mechanism. This is in contrast to many prior art devices wherein the bar would be mounted exteriorly of the car leading to many difficult mounting problems. By mounting bar 12 inside the automobile, the present invention provides a secure hold onto the car while the invalid is being transferred from the wheelchair to the inside of the automobile.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. Apparatus for transferring an invalid from a wheelchair to a motor vehicle comprising:
   a rigid bar;
   mounting means for mounting said rigid bar along the interior roof of an automobile wherein said bar is secured to the exterior roof of an automobile;
   winch means on said rigid bar, said winch means including bearing means to slide said winch means longitudinally along said bar; and
   carrying means for supporting a person, said carrying means being attachable to said winch means wherein said carrying means is raised and/or lowered by said winch means wherein said mounting means comprises:
   a first strap portion having opposed first and second ends;
   a second strap portion having opposed first and second ends;
   said first end of said first strap portion being hingedly connected to said bar and said second end of said first strap portion having a loop;
   said first end of said second strap portion being hingedly connected to said bar and said second end of said second strap portion being attachable to said bar; and
   wherein said second strap portion is brought through said loop of said first strap portion to secure said bar to a motor vehicle roof.

2. The apparatus of claim 1 wherein said rigid bar means is foldable about a hinge and including:
   means for locking said rigid bar means in an unfolded position.

3. The apparatus of claim 2 wherein:
   said bearing means includes a pair of wheels rotatably mounted on an axle, said axle being mounted in a support, said support being attached to said winch means.

4. The apparatus of claim 1 wherein:
   said rigid bar means has a substantially rectangular cross section defining a top, bottom and two opposed side surfaces, said bottom surface having a longitudinal slot through said bottom surface; and
   said winch means being mounted on said bar means through said slot.

5. The apparatus of claim 1 wherein:
   said carrying means comprises a basket, said basket having means for detachable connection to said winch means.

* * * * *